Figure 1:
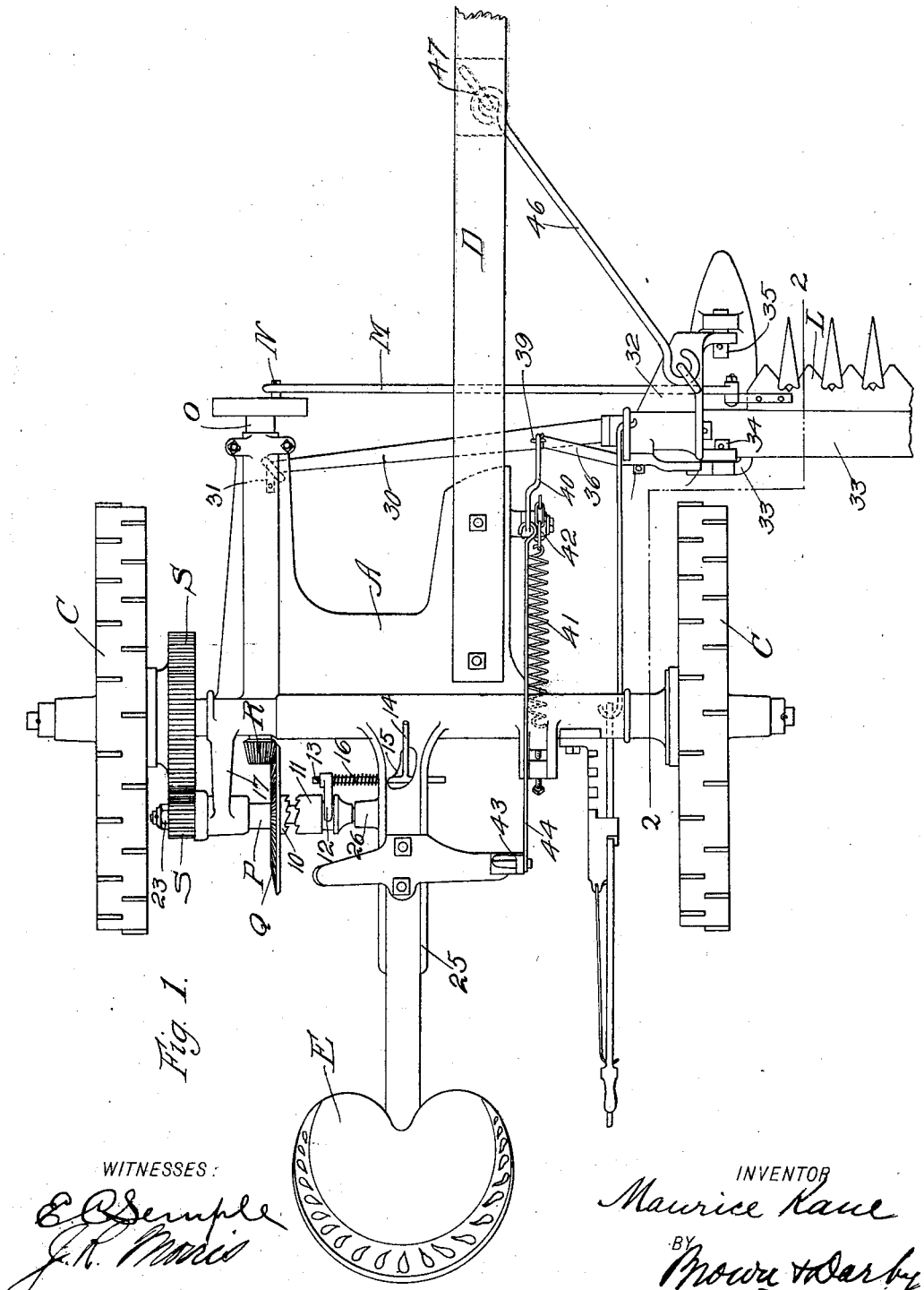

No. 628,248. Patented July 4, 1899.
M. KANE.
MOWING MACHINE.
(Application filed Mar. 30, 1898.)
(No Model.) 2 Sheets—Sheet 1.

WITNESSES:

INVENTOR
Maurice Kane
BY
Mower & Darby
ATTORNEYS

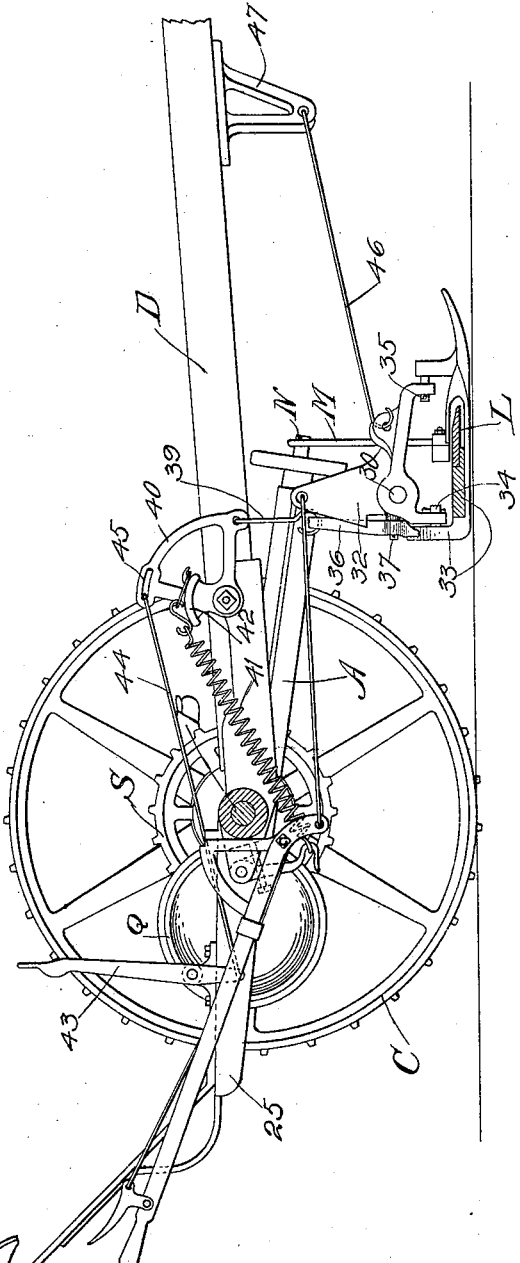

UNITED STATES PATENT OFFICE.

MAURICE KANE, OF AUSTIN, ILLINOIS.

MOWING-MACHINE.

SPECIFICATION forming part of Letters Patent No. 628,248, dated July 4, 1899.

Application filed March 30, 1898. Serial No. 675,824. (No model.)

*To all whom it may concern:*

Be it known that I, MAURICE KANE, a citizen of the United States, residing at Austin, in the county of Cook and State of Illinois, have invented a new and useful Mowing-Machine, of which the following is a specification.

This invention relates to mowing-machines.

The object of the invention is to simplify and improve the construction of machines of this class and to render the same more efficient in service.

The invention consists, substantially, in the construction, combination, location, and relative arrangement of parts, all as will be more fully hereinafter set forth, as shown in the accompanying drawings, and finally specifically pointed out in the appended claims.

Referring to the accompanying drawings, and to both views and reference-signs appearing thereon, Figure 1 is a plan view of a mowing-machine constructed in accordance with the principles of the invention and embodying the features of importance comprising the present invention, the tongue or draft-pole of the machine being broken off. Fig. 2 is a side elevation of the same, the main shaft being in transverse section on the line 2 2, Fig. 1.

Specifically referring to the various parts illustrated, reference-sign A designates the frame of the mower, in which is journaled the main shaft B, upon which are suitably journaled the traction-wheels C. D is the tongue or draft-pole of the machine, and E the seat for the driver. Except in the particulars hereinafter more specifically set forth these parts may be of the usual or any well-known or convenient construction and, except in their general arrangement and coöperative relation, do not require further specific description.

The desired reciprocations are imparted to the movable part L of the cutter-bar through a pitman M, suitably connected to a crank or wrist-pin N, carried upon a shaft O, suitably journaled in the framework A of the machine. Rotation is imparted to this shaft O from a counter-shaft P, suitably journaled and mounted, through the intermeshing bevel-gear Q and pinion R. Rotation is imparted to counter-shaft P from the main shaft or axle B through intermeshing pinions S. These parts may all be of the usual or any well-known construction and arrangement common in the art. Bevel-gear Q is loosely sleeved to rotate upon shaft P, but is adapted under the control of the driver to be clutched to rotate with said shaft or unclutched therefrom whenever occasion requires. A simple and convenient arrangement is shown for properly effecting the clutching of said bevel-gear Q to said shaft, as by providing said gear Q with clutch-teeth 10, with which coöperates a clutch-collar 11, suitably splined or otherwise mounted to rotate with shaft P. An arm 12 is arranged to engage said collar. This arm is carried by bar 13, which in turn is provided with an operating-lever 14, arranged to project through a cam-slot or opening 15, formed in a convenient part of the framework. A spring 16 is interposed between the frame of the machine and arm 12, the tension of which is normally exerted in a direction to cause collar 11 to engage clutch-teeth 10. By rocking lever 14 said lever engages the walls of the cam-slot 15, thus permitting the tension of said spring to be exerted in a manner to move collar 11 into or out of engagement with clutch-teeth 10, according to the direction in which lever 14 is rocked. This particular construction and arrangement, however, for effecting the clutching or unclutching of bevel-gear Q to shaft P forms in its specific construction and arrangement no part of the present invention, and many other suitable or convenient arrangements of devices for accomplishing the same object may be readily adapted for this purpose. That shown, however, is simple and efficient.

It will be observed that counter-shaft P is journaled at one end in an arm 17, projecting rearwardly from the framework. At the opposite end thereof said shaft is journaled, as at 26, in an arm 25, also projecting rearwardly from the machine-frame, and which arm carries the driver's seat E.

The feature of construction and arrangement forming the present invention relates to the connection of the counterbalance or carrying spring and the relation thereto of the foot-lever for elevating the cutter-carrying bar. In the usual construction of machines of this class a coupling-arm 30 is pivotally mounted at one end, as at 31, in a convenient part of the framework. This coupling-arm is loosely arranged to extend transversely of the machine, and upon the free end thereof is suitably sleeved a yoke or bridge 32. The cutter-carrying bar 33 is pivotally supported at the inner end thereof upon said yoke or bridge and upon an axis extending longitudinally of the machine and transverse with respect to the axis about which said yoke 32 is pivoted or sleeved, as indicated at 34 35. The cutter-carrying bar 33 is maintained in floating position by means of a gag-lever 36, pivotally mounted intermediate its ends, as at 37, upon yoke 32 and bearing at its free end, as at 38, upon an arm or projection formed on or carried by the cutter-carrying bar 33 at a point on the opposite side of the pivot of said cutter-carrying bar with reference to the extreme outer or free end of said bar. The other end of gag-lever 36 is connected through a link 39 with a bell-crank lever 40, suitably pivoted upon the framework of the machine. A carrying or counterbalance spring 41 is suitably connected at one end to the framework of the machine and at its other end is connected to the bell-crank lever 40. Heretofore in machines of this class the bell-crank connection of counterbalance-spring 41 has been at a point on the opposite side of the pivot of said bell-crank lever with reference to the connection of the other end of said spring to the framework and on the same side of the pivot of said bell-crank lever as the bell-crank-lever connection of link 39. The objection to this arrangement is that when the cutter-bar encounters an obstruction as the machine passes over the ground—such, for instance, as an unevenness in the surface of the ground—such as would tend to raise the same bodily parallel to the ground, the carrying or counterbalance spring 41, which when the cutter-bar is in its normal or operating position is under tension, begins to lose that tension through the rocking of bell-crank lever 40; but by reason of the connection of this carrying-spring to the bell-crank lever at a point on the opposite side of the pivot of said lever from the frame end connection of said spring as said bell-crank lever rocks by reason of the raising bodily of the cutter-bar the leverage exerted upon the bell-crank lever by the counterbalance or carrying spring 41 increases as the point of connection of such spring to the bell-crank lever approaches a position at right angles with reference to the horizontal plane containing the pivot of said bell-crank lever. The result of this increase in leverage exerted by the spring is to prevent the ready return of the cutter-bar to its normal or operating position in close proximity to the surface of the ground when the obstruction or unevenness which caused such bar to be raised bodily has been passed, thus resulting in an unevenness in the cut made by the cutter and preventing the cutter from evenly and uniformly following the contour of the surface of the ground over which the machine operates. In order to avoid this objection, I provide bell-crank lever 40 with a circular flange 42, struck from the pivot of said bell-crank lever as a center, and to this flange I attach the end of spring 41 in such manner that when the cutter-bar is in its normal or operating position the bell-crank end of spring 41 is wound over or upon this circular flange, as clearly shown in Fig. 2, so that while the extreme end of spring 41 is actually connected to the bell-crank lever 40 at a point on the opposite side of the pivot of said bell-crank lever from the frame connection of said spring still the power exerted by said spring upon the bell-crank lever is always exerted at a point the same distance from the pivotal axis of the bell-crank lever. The result of this construction and arrangement is to prevent an increase in leverage being exerted by the spring upon the bell-crank lever in case the cutter-bar is raised bodily from the ground by meeting or overriding an obstruction, and hence to permit the ready and quick return of the cutter to its normal or operating position as soon as the obstruction is passed.

In the construction of mowing-machines of the floating-bar type, to which class of machines the present invention relates, it is customary to provide means by which the cutter-carrying bar may, under the control of the driver, be elevated out of proximity to the surface of the ground in order, for instance, that the machine may be moved or transported without effecting a cutting action and without danger of encountering obstructions. To this end it is customary to provide a foot-lever 43, pivotally mounted upon the framework of the machine and of convenient access to the driver, which foot-lever is connected, through a rod 44, to the bell-crank lever 40, the bell-crank-lever connection of said rod 44 being loose—as, for instance, by making such connection in a slot 45—thus permitting the bell-crank lever to be rocked when the cutter-bar is raised upon meeting an obstruction without the necessity of operating foot-lever 43. In the prior constructions of machines of this class, wherein the leverage exerted by carrying-spring 41 increases as the cutter-bar rises, as above explained, it will be evident that such increase in leverage of said spring facilitated and assisted the driver when it was desired to raise the cutter-bar by manually operating foot-lever 43. In the present instance, however, I have provided, as above explained, an arrangement whereby the leverage of counterbalance-spring 41 is not increased. Therefore in order to compensate for this loss of effective leverage, which has heretofore been utilized to assist the driver in raising the cutter-bar, I so relatively arrange the connection 44 between lever 43 and bell-crank 40 as to increase its leverage in the same proportion in which the leverage of spring 41 is decreased. To this end rod 44 is so connected to foot-lever 43 that as said foot-lever is rocked to elevate or raise the cutter-bar and as the tension of spring 41, which tension is exerted through a constant leverage, is relieved by the rocking of bell-crank lever 40 to compensate for such decrease in the tension exerted by spring 41 on bell-crank 40 the leverage exerted by foot-lever 43 increases, thus enabling the cutter-bar to be raised with equal facility in the present machine as compared with the prior constructions, wherein the raising of such cutter-bar through the foot-lever was assisted by the increase in leverage exerted upon the bell-crank lever by the carrying-spring. Therefore in the present construction I not only secure uniform leverage of spring 41, but I also compensate for the loss of such leverage when the cutter-bar is raised manually by the operation of lever 43. This compensation is secured by the relative arrangement and connection of rod 44 to the bell-crank lever 40 at one end and to the foot-lever 43 at the other, this relative arrangement being such as to secure an increase of the leverage exerted by the foot-lever as the cutter-bar is raised.

The cutter-bar may be suitably braced by any convenient or well-known arrangement. In the form shown I provide a draw-bar 46, suitably connected at one end to bridge or yoke 32 and preferably at a point forward of the pivot thereof about coupling-arm 30, and the other end of said draw-bar may be connected in any suitable or convenient manner to the draft-pole or tongue B or single or double tree or in any other manner—as, for instance, to a bracket or arm 47.

Many variations and changes in the details of construction and arrangement would readily suggest themselves to persons skilled in the art and still fall within the spirit and scope of my invention. I do not desire, therefore, to be limited or restricted to the exact details shown and described; but, Having now set forth the object and nature of my invention and a form of apparatus embodying the same and having explained the construction, function, and mode of operation thereof, what I claim as new and useful and of my own invention, and desire to secure by Letters Patent of the United States, is—

1. In a mowing-machine, a cutter-bar, a bell-crank lever, connections between such lever and bar, a carrying or counterbalance spring connected at one end to the frame of the machine, and means for connecting the other end of said spring to said bell-crank lever on a curve concentric with the pivotal axis of said lever, whereby when the cutter-bar is raised by meeting an obstruction, thereby rocking said lever, the leverage through which said spring acts upon such lever is not varied, as and for the purpose set forth.

2. In a mowing-machine, a cutter-bar, a bell-crank lever, connections between such lever and bar, a carrying or counterbalance spring connected at one end to the frame of the machine, a circular flange carried by said lever, the curvature of said flange being concentric with the pivotal axis of said lever, the other end of said spring being connected to said flange, whereby during the rocking movement of said lever the leverage exerted by such spring upon said lever is not varied, as and for the purpose set forth.

3. In a mowing-machine, a framework, a cutter-bar, a bell-crank lever pivotally mounted upon said framework and connected to said bar, a counterbalance-spring connected at one end to the framework and at the other end to such bell-crank lever, said bell-crank-lever connection of the spring being on a curve concentric with the pivotal axis of such lever, in combination with a foot-lever, a rod connecting said foot-lever and bell-crank lever, whereby when said foot-lever is actuated to rock said bell-crank lever, thereby raising the cutter-bar, the loss of tension of said spring is compensated for by the increase in leverage exerted by said foot-lever upon said bell-crank lever, as and for the purpose set forth.

In witness whereof I have hereunto set my hand this 23d day of March, 1898, in the presence of the subscribing witnesses.

MAURICE KANE.

Witnesses:
S. E. DARBY,
E. C. SEMPLE.